W. BECKSTROM.
AUTOMATIC COUPLING.
APPLICATION FILED JUNE 5, 1917.
1,263,999.
Patented Apr. 23, 1918.
2 SHEETS—SHEET 1.
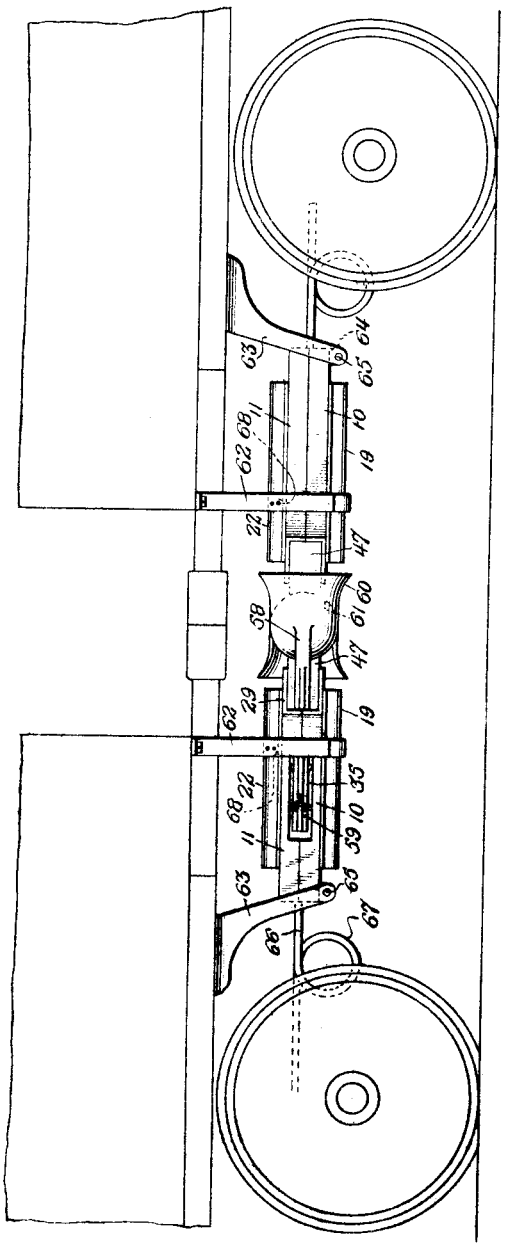
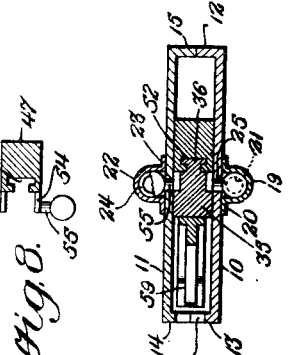
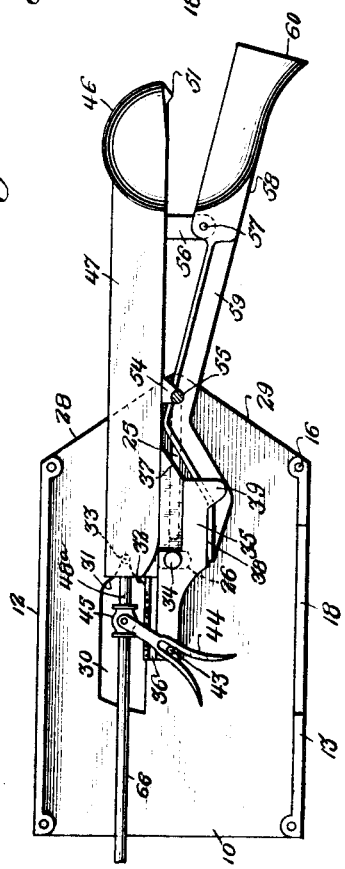
WITNESSES
J H Crawford
H. G. Pierson
INVENTOR
William Beckstrom,
BY Victor J. Evans
ATTORNEY

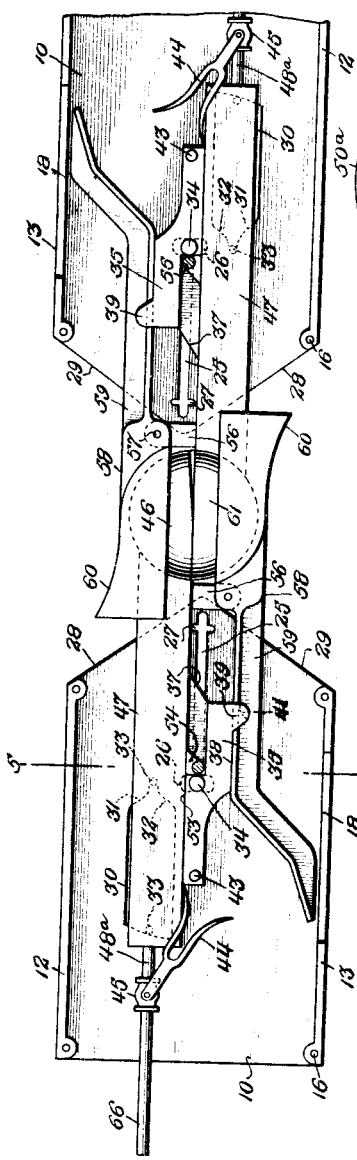

UNITED STATES PATENT OFFICE.

WILLIAM BECKSTROM, OF RICE LAKE, WISCONSIN.

AUTOMATIC COUPLING.

1,263,999. Specification of Letters Patent. Patented Apr. 23, 1918.

Application filed June 5, 1917. Serial No. 172,958.

*To all whom it may concern:*

Be it known that I, WILLIAM BECKSTROM, a citizen of the United States, residing at Rice Lake, in the county of Barron and State of Wisconsin, have invented new and useful Improvements in Automatic Couplings, of which the following is a specification.

This invention is an automatic coupler more particularly adapted for connecting the ends of fluid conductors as employed on railroads.

When cars are attached or detached or a train made up or broken, it is usual with the equipment employed to do the coupling and uncoupling by hand. Sometimes owing to the shortness of time, the air hose is not coupled or the brakeman overlooks turning the air hose cock to its operative position.
These neglects render the cars back of them useless so far as the air brake is concerned. This also takes from the engineer a control over the train that he should have, this being especially true with the long and heavy trains commonly used. It is also common to pass between cars, in order to couple the air hose.

To avoid the dangers and disadvantages arising from using the present equipment and to produce an automatic coupling with an automatic control of the air hose cock, the present invention has for one of its objects to provide a coupling that is automatic and that when in its operative coupled and interlocked position will maintain the air line in a non-leaking condition when subjected to the strain and vibration incident to train movement, one that is simple and strong in construction and therefore durable, one that is cheap to manufacture, and one that is efficient and reliable.

Another object is to provide for an automatic control of the air hose cock in its opening and closing upon coupling and uncoupling as the cars are brought together and separated.

The invention, broadly stated, comprises a hollow casing having members formed upon the flat sides thereof for the disposition of resilient elements therein, slots in the flat sides to coöperate with the resilient elements, a pair of jaws including arms therefor, one of said arms being provided with a through passage to connect with the air hose of the car, a valve, and an operating lever therefor in the air line, a groove formed in one side of said arm, the other arm being T-shaped in cross section, and pivotally mounted with respect to the first arm, and bent to lie in different planes, a movable block formed to engage with the groove and with the T-shaped section, said block carrying adjacent one end means to engage with the valve operating lever to open and close the said air valve, the part carried by the arm having the passage therethrough being substantially hemi-spherical in shape and provided upon its flat side with an aperture, and concentric with said aperture suitable grooves in which may be disposed packing, said other jaw being adapted to coöperate with another hemi-spherical jaw to clamp the two hemispherical jaws together upon their flats sides to form an air-tight joint therebetween, and means to suspend the coupling beneath the floor of the car.

One practical form of the invention will be discribed and illustrated in the accompanying drawings, in which:—

Figure 1 is a side elevation showing the ends of two cars with the couplings in operative position;

Fig. 2 is a top plan view of the two couplings in an operative position with the cover or top plates removed;

Fig. 3 is a top plan view of a coupling in an open position;

Fig. 4 is a longitudinal sectional view of the ends of two couplings when in engagement;

Fig. 5 is a sectional view on the line 5—5 of Fig. 2;

Fig. 6 is a perspective view of the slide jaws;

Fig. 7 is a detail perspective view of one of the hemi-spherical jaws.

Fig. 8 is a detail transverse sectional view through one of the coupling member arms and Fig. 9 is an end elevation of the sliding jaw shown in Fig. 6.

In the preferred embodiment shown, each half of the coupler is mounted within a casing. This casing is formed of two flat members 10 and 11, provided with the flanges 12, 13, 14 and 15, respectively. These flanges extend longitudinally and form side walls, and they are preferably provided with suitable apertures, indicated at 16, through which may pass suitable bolts to hold the two flat members in engagement with their flanges abutting. The flanges 13 and 14 are provided with notched spaces so that when they are assembled together, a slot 18 is formed.

The bottom plate 10 carries upon its outer side a cylindrical member 19, which has the flanges 20. One end of the cylindrical member 19 is closed, while the other end is open, and disposed within this cylindrical member 19 is a spring 21. The top plate 11 carries also a cylindrical member, indicated at 22, with the flanges 23 having the spring 24 therein. These flanges 20 and 23 may be provided with holes so that the several flanges and their cylindrical members may be secured to the plates 10 and 11 in any usual and customary manner.

The cylindrical members 19 and 22 are adapted to serve as guides for the springs 21 and 24. In the bottom plate 10 there is an elongated slot 25, which terminates adjacent the slot indicated at 26. Adjacent the forward end this slot is provided with notches upon either side indicated at 27. The forward end of the bottom plate 10 is angularly cut, and this slot 25 begins near the apex or angle formed by the juncture of the two sides indicated at 21 and 29.

The top plate is also provided with a similar slot and recesses and angularly cut ends. The slot 25 extends in a longitudinal direction of the plate 10 and communicates with the interior of the cylindrical member 19, which has the spring 21 therein. The purpose of this slot with its various recesses and spring will be described more particularly hereafter.

Disposed in a plane parallel to the slot 25 is another slot indicated at 30, which is provided at one end with curved sides indicated at 31 and 32, terminating in a contracted portion, which affords a seat for a pin 33.

The top plate 11 is preferably not provided with a slot 30. The recess 26 is adapted to engage with a pin 34, which pin projects through a block having the body portion 35. Extending longitudinally of the body portion 35 is a T-shaped member indicated at 36. The forward end of this block is curved as indicated at 37, and connects with a flat bearing portion 38 formed upon the side opposite to that carried by the T-shaped section 36.

Disposed upon the body portion and adjacent this curved end 37 are two lugs, which extend outwardly as indicated at 39 and 40. These lugs 39 and 40 are provided with inwardly directed flanges 41 and 42. These flanges do not meet, but form a slot therebetween. Adjacent the rear end of the body portion is a pin 43 which is adapted to coöperate with the valve operating lever 44 connected to the valve indicated at 45. The lever, as shown, is preferably of a bifurcated type provided with curved arms extending from a straight portion, forming a Y so that the pin 43 is adapted to ride between the arms thereof.

The coupling members comprise two jaws, one of which is provided with a hemispherical end 46, carried upon an arm 47. Within the arm 47, a through passage 48 is formed, which is provided at its outer end with a connection indicated at 48ª, in which is disposed the valve 45 to permit air to pass to the flat face of the hemispherical end 46.

The flat surface of the hemisphere 46 is provided with an aperture formed centrally thereof, and disposed concentrically to this aperture is a shouldered groove 49 in which is disposed a suitable packing element indicated at 49ª. This packing element may be of any form or type, and in order to hold it within the groove, holding means may be employed such as are indicated by the plate 50 and the screws 50ª.

Adjacent the forward and abutting end of the hemisphere and upon the flat side, there is provided an angular flange 51, which prevents the complementary hemisphere from tearing or injuring the gasket 49ª. The angular end is adapted to force the hemisphere outwardly so that it may be readily disengaged. To coöperate with this flange the groove 51ª is formed with the same radius of curvature as the flange and is continuous therewith. As shown in Fig. 7 this will provide a pivotal movement between the two jaws. The arm has formed longitudinally a T-shaped slot 52 that is adapted to coöperate with the T-shaped member 36 carried by the body 35 of the block. The side of the arm adjacent the T-slot 52 is formed to have a bearing surface and upon this surface the bearing portions indicated at 53 carried by the block 35 are adapted to ride. This will enable the block to ride more easily in contact with the arm.

Disposed at some point midway of this arm 47 are projecting members, indicated at 54, that are provided with pins 55. These pins 55 are adapted to project in the slots 25 and are provided with suitable means for engaging with the springs 21 and 24.

Adjacent the hemispherical jaw end, there is a standard or support 56, which is provided with a suitable aperture through which passes a pin 57 to provide a pivotal mounting for a clamping or holding jaw 58 carried upon the arm 59. The inner surface of this clamping jaw 58 is preferably a hemisphere to form a socket to engage with a hemispherical seat carried by a supporting coupling so that when the two hemispheres are in engagement, this jaw 58 is adapted by its pivotal mounting through the pin 58 to hold the other jaw in firm engagement with its hemispherical jaw.

The jaw 58 is provided at its outer end with a flared portion indicated at 60 and the flare is so constructed that it serves to direct the convex portion of the opposing hemisphere 61 into engagement with its own hemisphere 46. The arm 59 is T-shaped in cross section, and is so formed that the several portions of the arm lie in different planes. The transverse portion is adapted to coöperate with the lugs 39 and 40 and the flanges 41 and 42 are also adapted to coöperate and permit the horizontal portion of the T to pass in the slot formed between the flanges. The arm 59 is so formed that when it is moved through and between these lugs 39 and 40, by means of its pivotal mounting, the flared end 60 is moved outward so as to be in an engaging position to receive the hemispherical jaw 61. As the two couplings are brought together and the hemispheres engage with their respective sockets and with each other, the pressure forces the arm 47 inward and the blocks 35 being relatively immovable by means of the pins 34 and its contour shown by the curved end 37, the transverse portion of the T of the arm 59 forces the flared end 60 and its jaw socket into engagement with the opposing hemisphere.

The casing is preferably supported below the car coupler by means of a yoke indicated at 62 supporting the casing at its forward end. To support the casing at its rear end another yoke indicated at 63 is employed, which engages with the bottom plate 10 by means of the lugs 64 and the holding means indicated at 65. The air line hose indicated at 66 may be provided with a bend 67 which is made for the purpose of giving a flexible connection between the hose 66 and the coupling. The yoke 62 may be provided with the stops 68 which may also serve as guide members.

In practical operation when the couplings are disposed upon the ends of the cars and are brought into abutting relation for coupling, the hemispherical ends ride in the opposed flared end indicated at 60 until they rest within their respective sockets. As the arms 47 are forced backward within their casings, they move the valves 45. The movements of the valves 45 produce a movement in the operating levers 44, which by means of their forked ends coöperate with the pins 43, which movement operates to open the valves. At the same time the arms 47 are moved backward, the arms 59 by means of their pivotal connection operate to hold the opposing hemispherical ends in firm engagement, the pivotal movement being produced by the arms moving backward in an operative relation relative to the block, the body of which is indicated at 35. The arms move inwardly relative to their respective blocks. As the arms 59 move backward, the lugs formed upon this block contact with and ride upon the T-shaped portion, which serves to position the flared ends into firm engagement and thereafter hold them in their operative relation.

Minor changes in the form, proportions, and details of construction may be resorted to without departing from the spirit of the invention or the scope of the appended claims.

What is claimed as new is:—

1. An automatic air pipe coupling comprising a hollow casing, a pair of jaws and arms therefor operatively connected for movement therein, one of the jaws being pivotally mounted relative to the other and provided with a T-shaped arm formed to lie in different planes, and a block operatively connecting the arms and adapted to move the pivotally mounted T-shaped arm into a plurality of positions, and means to permit of pivotal movement of both of the jaws and arms.

2. An automatic air pipe coupling comprising a hollow casing, a pair of jaws including arms movably carried in the casing, one of the jaws and its arm being provided with a through passage and a groove, a valve and a lever therefor at one end of the arm including a connection for an air pipe, another of the arms being pivotally mounted and T-shaped in cross-section and bent to lie in different planes, and a block formed to coöperate with the groove of one arm, the T-shaped section of the other arm, and the valve lever, the relative movement of the block opening and closing the valve by varying the position of one of the jaws with respect to the other.

3. An automatic air pipe coupling comprising a pair of pivotally mounted jaws including arms therefor carried in a casing, resilient means serving to project the arms and jaws from the casing, means interposed between the arms and operatively connected for moving one of the arms relative to the other, one of said arms being provided with a through passage for air, a valve including an operating lever therefor mounted on the arm, said lever being operatively connected with the interposed means to automatically control the flow of fluid through the valve and passage as the jaws and their arms are moved within the casing.

4. An automatic air pipe coupling comprising a pair of pivotally mounted jaws including arms therefor carried in a casing, one of said jaws being of substantially hemispherical shape, the other of said jaws being formed to have a hemispherical concave seat with a guide flange on one side thereof, means operative on coupling and uncoupling to move the jaws relative to each other to engage with similar opposing jaws, and means to mount the casing on a car.

5. An automatic air pipe coupling comprising a hollow casing having slots formed therein, a pair of jaws including arms therefor mounted for movement in the casing, one of said jaws being hemispherical in shape and on its flat side having an aperture disposed therein, a groove concentric therewith, including a gasket, and a flange of angular shape adjacent a portion of the groove and the peripheral edge of the jaw, a block to coöperate with the arms, and jaws to move them into and out of engagement with opposing jaws similiarly formed, one of said jaws having a through passage connecting with the aperture in the jaw, and a valve including a lever to control the flow of fluid through the passage, said lever being operatively connected with the block.

In testimony whereof I affix my signature,

WILLIAM BECKSTROM.

Copies of this patent may be obtained for five cents each, by addressing the "Commissioner of Patents, Washington, D. C."